Sept. 13, 1955 N. WEINTRAUB 2,717,992
TRANSIENT SURGE DETECTOR
Filed Oct. 20, 1951

INVENTOR
NELSON WEINTRAUB
BY
ATTORNEY

United States Patent Office 2,717,992
Patented Sept. 13, 1955

2,717,992

TRANSIENT SURGE DETECTOR

Nelson Weintraub, Irvington, N. J., assignor to International Telephone and Telegraph Corporation, a corporation of Maryland Application October 20, 1951, Serial No. 252,393

6 Claims. (Cl. 340—253)

This invention relates to fault locator systems for power lines and more particularly to transient surge detectors useful in such systems.

The problem of locating faults on a power line has long plagued the power industry. It is particularly troublesome since approximately 90 per cent of all faults are not sustained, and hence the location of the fault must be determined on an instantaneous basis. In the copending application of R. W. Hughes and N. Weintraub Serial No. 252,392, filed October 20, 1951, for power line fault locator, a system is disclosed for locating faults regardless of whether or not they are sustained. Briefly, the system therein disclosed provides a transient surge detector adjacent two points spaced some distance apart along the line to be monitored. A time interval measuring device is provided which is controlled by a detected surge at one of such points and a signal transmitted in response to detection of a surge at the other of said points. The time measurement thus obtained corresponds to the time required for the fault surge to travel from the fault to one or the other of the detection points, thereby giving a distance measurement to the location of the fault.

One of the objects of the present invention is the provision of a circuit for detecting transient fault surges regardless of their polarity, wide variations in amplitude and/or voltage rise time.

Another object of the invention is the provision of a circuit for detecting transient surges regardless of their polarity and trailing fluctuations, and to produce a distinctive signal having a leading edge corresponding substantially in timing to the leading edge of the transient.

One of the features of the invention is the provision of a parallel circuit having a common input, one branch of the circuit being adapted to detect transients of positive polarity and the other branch of the circuit being adapted to detect transients of negative polarity. The circuit is further characterized by the provision of means for applying an output pulse of a detected transient to a pulse shaping circuit whereby a distinctive pulse of given amplitude and duration is produced having a leading edge corresponding in timing to the leading edge of the transient.

The above-mentioned and other features and objects of this invention and the manner of attaining them will become more apparent by reference to the following description taken in conjunction with the accompanying drawings, wherein.

Figure 1:
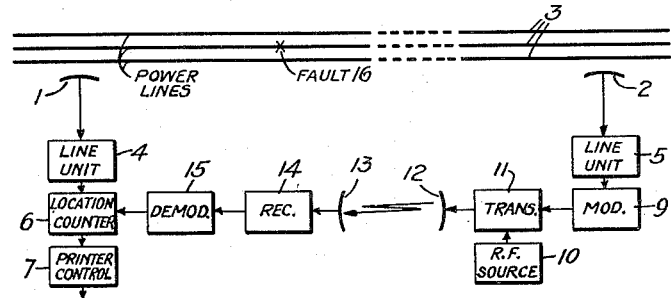
Fig. 1 is a schematic block diagram of the fault locating system for power lines illustrating the use therein, as line units, the transient surge detector of the present invention.

Referring to Fig. 1 of the drawing, a fault locating system for power lines is shown comprising two capacitive coupling elements 1 and 2 spaced some distance apart along a length of power line 3 to be monitored. The coupling elements 1 and 2 are connected to line units 4 and 5, respectively, each of which comprise a transient surge detector circuit in accordance with the illustrations of Figs. 2 and 3. The output of the line unit 4 is coupled to a location counter 6 which includes a counting circuit adapted to be initiated into operation by the distinctive signal output of the unit 4 and stopped by a corresponding signal received from the line unit 5. The time measurement thus provided at 6 is applied to a printer control 7 which in turn operates a printer 8 to record the distance from one or the other of the elements 1 and 2 to the location of the fault, together with the month, day, year, minute, and second the record is printed.

The distinctive signal output of the line unit 5 is applied to a modulator 9 for modulating an R. F. carrier from source 10 for transmission through transmitter 11 and directive antenna 12 to a receiver antenna 13 of receiver 14 located near the site of the detector element 1. The received signal is demodulated at 15 and applied to the location counter to stop the counting operation initiated by reception of the first signal from line unit 4. One or more repeater stations may, of course, be used between the transmitter and receiver dependent upon the distance and the nature of the terrain.

Where a fault occurs at 16 between the detection points 1 and 2, a transient surge will travel in opposite directions along the power line 3. The time required for the surge to travel from the fault to the detecting element 2 is determined by the location counter by taking one half of its time measurement between reception of fault pulses from units 4 and 5, assuming the electrical length of the power line equals that of the radio path. Thus, the printer may be arranged to automatically divide the transmission time by two thereby giving an accurate measure of the time required for a fault transient to travel from point 16 to detecting point 2. This time measurement may be converted to miles by making use of the fact that it takes $1/186,000$ second for a transient surge to travel one mile. Where the counter is operated on a time basis determined by oscillation frequency having a period equal to .672 microsecond, for example, then each such increment may be taken as $1/8$ mile. The measurement thus will be accurate within $1/8$ of a mile.

For more detailed information of the fault locator system, as a whole and for certain variations thereof, reference may be had to the aforesaid copending application.

Figure 2:
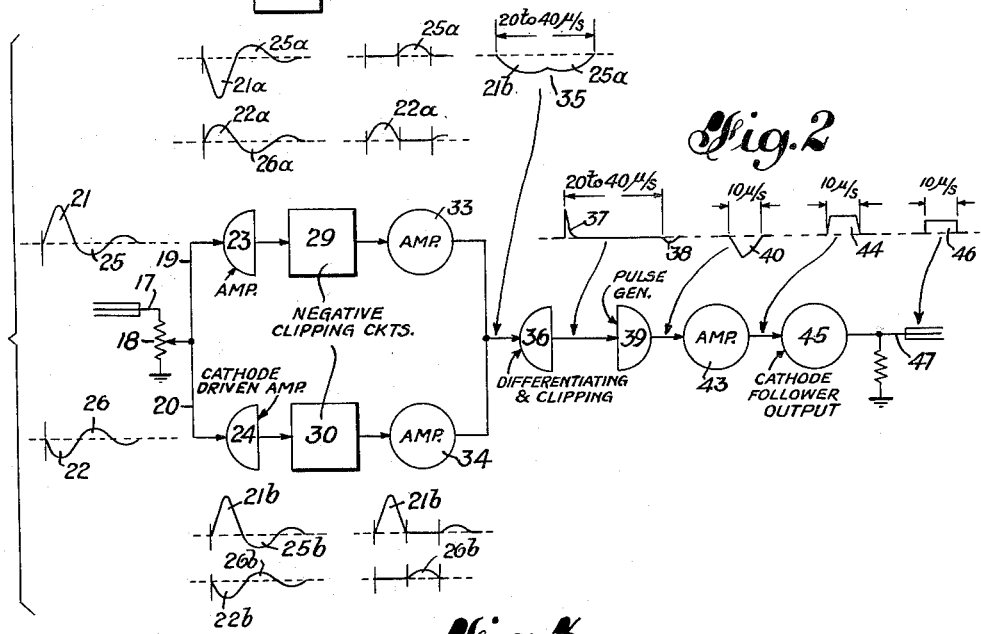
Fig. 2 is a block diagram together with curves useful in describing the line unit of the system wherein the transient fault surges flowing along the power line are detected and translated into a pulse of given distinctive characteristics.
Figure 3:
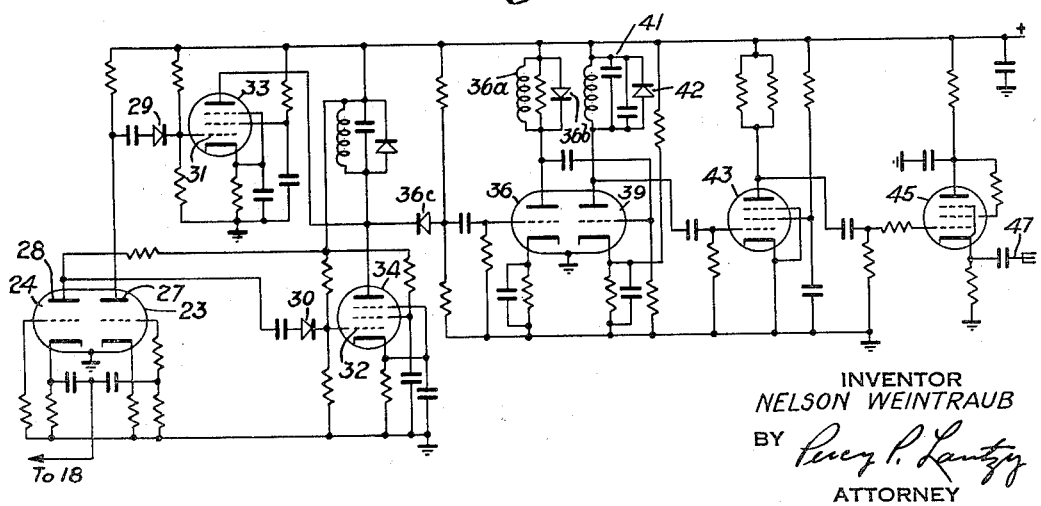
Fig. 3 is a schematic circuit diagram of the transient surge detector as shown in the block diagram of Fig. 2.

Referring particularly to Figs. 2 and 3 of the drawing, the transient surge detector employed as "line units" in the system of Fig. 1 is shown to comprise an input connection 17 which may be associated with either detecting element 1 or 2, as the case may be. The input connection 17 is applied through a potentiometer 18 to a parallel circuit comprising branches 19 and 20. The potentiometer 18 besides serving as a coupling unit also acts as a gain control. The branch circuit 19 responds to transient surges of positive polarity to produce an output of a given polarity, and the branch 20 responds to surges of negative polarity to produce an output pulse of the said given polarity. The line unit produces a distinctive pulse output signal in response to detection of the occurrence of a transient surge along the power line regardless of any one or any combination of a number of transient surge conditions. The unit produces a distinctive pulse which, by way of example, may be 15 volts in amplitude and/or about 10 microseconds duration, the rise and decay time being in the neighborhood of about 0.2 microsecond maximum, and whose leading edge corresponds in time to the leading edge of the fault transient surge. The unit responds to pulse inputs from the power line regardless of variations such as follows:

1. Input pulses of amplitude ranging from 0.05 volt to 70 volts or greater.
2. Pulses either positive or negative polarity.
3. Pulses having buildup time ranging from one to as much as 20 microseconds.
4. Any combination of the above three variations.

In addition, the line unit discriminates against trailing fluctuations or "overshoots" at the end of transient surges. For example, when a surge enters the line unit the leading edge of the incident transient controls the measurement of the fault locator system. In order to preserve and define this edge until it passes through the line unit, no additional output will be obtained from the line unit for a period of at least 20 microseconds following the incident leading edge. Any trailing fluctuations or overshoots are thus ignored so that no ambiguity results in the output of the line unit. The line unit thus distinguishes between "wanted" and "unwanted" pulses, the "wanted" pulse, of course, being the initial undulation of the transient while the "unwanted" pulse is the overshoot undulation both positive and negative which follow the initial undulation.

A fault surge, which may be represented by positive pulse 21 or negative pulse 22, passes through amplifiers 23 and 24. The amplifier 23 is a normal class A amplifier and amplifies the input pulse, either positive or negative, converting such pulses as 21 and 22 to output pulses 21a and 22a, respectively. Amplifier 24 is a cathode driven class A amplifier which amplifies the fault surge but does not invert the input signal, the output in response to a positive pulse 21 or a negative pulse 22 being represented by output pulses 21b and 22b, respectively. Any overshoots of the incident undulation of the transient, such as shown at 25 and 26 are passed by the amplifiers 23 and 24 as indicated at 25a, 26a and 25b, 26b, respectively. These output waves are fed from plates 27 and 28 through negative clipping circuits 29 and 30 to the control grids 31 and 32 of amplifier tubes 33 and 34. The tubes 33 and 34 operate as class A amplifiers having a common plate circuit consisting of a tuned circuit damped by a crystal diode. The negative clipping circuits 29 and 30 allow only the positive signals to leave the grids 31 and 32. If any overshoots are present in the transient surge at the inputs of these clipping circuits, only the positive undulations thereof are passed. As shown in the curves at the input of amplifiers 33 and 34, the positive input undulations 22a and 25a appear in the branch circuit 19 at the amplifier 33, while positive undulations 21b and 26b appear in the branch circuit 20 at the amplifier 34. Regardless of whether a positive transient surge or a negative transient surge is applied to the parallel circuit, output pulses 21b and 25a will appear in response to an input pulse 21, and output pulses 22a and 26b will appear in response to input pulse 22. This incident pulse and overshoot undulation results in a composite output pulse 35, the two portions of the composite pulse being overlapped because of the capacity smoothing action of the circuit. This output pulse 35 may vary in duration from approximately 20 to 40 microseconds. It is the overshoots which tend to vary widely the duration of the output pulse 35.

The composite pulse 35, which in the present showing is negative, is applied to a differentiating and clipping circuit of tube 36 which includes inductance 36a and rectifier 36b, Fig. 3, also diode 36c which insures only a negative pulse at the grid of tube 36 since diodes 29 and 30 will not do this at small signal levels. The differentiating action at 36 produces a relatively sharp positive pulse 37 followed by a negative pulse 38. This sharp pulse 37 enters the tube section 39 which operates very close to cutoff and generates a 10 microsecond negative pulse 40 in the plate tuned circuit 41. The crystal diode 42 insures only a negative pulse output. This negative pulse 40 is applied to amplifier 43 which is normally conducting, so as to produce on the plate of tube 43 a limited positive pulse 44 of 10 microseconds duration. The output of tube 43 is applied to a cathode follower amplifier 45 which further amplifies and shapes the pulse as indicated at 46. The final output pulse 46 obtained from the output connection 47 is the distinctive fault pulse which, on the one hand, is transmitted from line unit 4 to the location counter 6 and, on the other hand, from line unit 5 through transmitter 11 for transmission to the receiver 14 and from there to the location counter 6.

While the detector circuit provides for an output pulse of a distinctive amplitude and duration, it will be understood that the amplitude and duration may be considerably different from the values indicated so long as the output pulse is distinctive and will not be lost in transmission by distortion from noise and/or other signal pulses that may be transmitted simultaneously with the random occurrence of the fault pulse. In other words, the output pulse of the detector circuit may be shaped as desired, either for transmission over a complex radio link or as may be required for actuation of the location counter.

While I have described above the principles of my invention in connection with specific apparatus, it is to be clearly understood that this description is made by way of example only and not as a limitation to the scope of my invention as set forth in the objects thereof and in the accompanying claims.

I claim:

1. A transient surge detector comprising a circuit having two branches, means coupling transient surges to said circuit, one branch of said circuit having means to detect undulations of positive polarity and the other branch of said circuit having means to detect undulations of negative polarity, and means to combine the undulation outputs of said branches, the means to detect in said one branch comprising a normal class A amplifier and a clipping circuit to insure an output of a given polarity, and the means to detect in said other branch comprising a cathode driven class A amplifier and a clipping circuit to insure an output for said other branch of said given polarity.

2. A transient surge detector comprising a circuit having two branches, means coupling transient surges to said circuit, one branch of said circuit including amplifying means to detect undulations of positive polarity and the other branch of said circuit including amplifying means to detect undulations of negative polarity, means to combine the undulation outputs of said branches, means to reshape the combined undulation output to produce a pulse signal having a leading edge corresponding substantially to the time occurrence of the leading edge of the detected transient.

3. A transient surge detector comprising a circuit having two branches, one branch having means to detect undulations of positive polarity and the other branch having means to detect undulations of negative polarity, means to combine the undulation outputs of said branches, and means to reshape the combined undulation output to produce a pulse signal having a leading edge corresponding substantially to the time occurrence of the leading edge of the detected transient, the means to reshape the combined undulation output including a third circuit comprising a differentiating circuit to obtain a relatively sharp pulse corresponding to the leading edge of the transient, a pulse generator triggered by said sharp pulse to produce a pulse of a given duration and amplifier means for shaping said duration pulse for a given amplitude.

4. A transient surge detector for detection of transient surges regardless of polarity and build-up characteristics of such surges, comprising a parallel circuit having two branches, an input means coupling transient surges to said parallel circuit having a potentiometer in common with the two branches thereof, one branch having a normal class A amplifier, a negative clipping circuit to insure an output of a given polarity, the other branch having a cathode driven class A amplifier and a negative clipping circuit to insure an output of said given polarity, a third circuit coupled to the output of said parallel circuit, said third circuit having a differentiator to produce a sharp pulse corresponding to the leading edge of the combined output of said branches which corresponds in time to the leading edge of the input transient.

5. A transient surge detector for detection of transient surges regardless of polarity and build-up characteristics of such surges, comprising a parallel circuit having two branches, an input to said parallel circuit having a potentiometer in common with the two branches thereof, one branch having a normal class A amplifier, a negative clipping circuit to insure an output of a given polarity, the other branch having a cathode driven class A amplifier and a negative clipping circuit to insure an output of said given polarity, a third circuit coupled to the output of said parallel circuit, said third circuit having a differentiator to produce a sharp pulse corresponding to the leading edge of the combined output of said branches which corresponds in time to the leading edge of the input transient and further including a pulse generator responsive to said sharp pulse to produce a pulse of a given duration and amplifier means for shaping said given duration pulse for a given amplitude characteristic.

6. A transient surge detector, comprising a circuit having two branches, means coupling transient surges to said circuit, one branch of said circuit including an amplifying means to detect undulations of positive polarity and the other branch of said circuit including an amplifying means to detect undulations of negative polarity, means to combine the undulation outputs of said branches, and a differentiating and clipping circuit to produce a pulse corresponding to the leading edge of the initial undulation and to suppress those undulations trailing the initial undulation.

References Cited in the file of this patent
UNITED STATES PATENTS

| | | |
|---|---|---|
| 2,118,626 | Smith | May 24, 1938 |
| 2,207,048 | Campbell | July 9, 1940 |
| 2,226,459 | Bingley | Dec. 24, 1940 |
| 2,271,876 | Seeley | Feb. 3, 1942 |
| 2,408,078 | Labin et al. | Sept. 24, 1946 |
| 2,628,267 | Stringfield et al. | Feb. 10, 1953 |